S. DAHLBERG.
AIR COMPRESSING PUMP.
APPLICATION FILED JUNE 1, 1908.

904,940.

Patented Nov. 24, 1908.

WITNESSES:
G. R. Driscoll.
R. M. Mowry.

INVENTOR,
Sven Dahlberg,
BY
ATTORNEY.

UNITED STATES PATENT OFFICE.

SVEN DAHLBERG, OF SPRINGFIELD, MASSACHUSETTS.

AIR-COMPRESSING PUMP.

No. 904,940.   Specification of Letters Patent.   Patented Nov. 24, 1908.

Application filed June 1, 1908. Serial No. 435,921.

*To all whom it may concern:*

Be it known that I, SVEN DAHLBERG, a Swedish subject, and resident of Springfield, in the county of Hampden and State of Massachusetts, have invented certain new and useful Improvements in Air-Compressing Pumps, of which the following is a full, clear, and exact description.

The object of this invention is to provide a new and improved air-compressing pump, especially available for the inflation of pneumatic tires for the wheels of automobiles, bicycles and other vehicles, and susceptible of being operated, primarily, by a foot motion rather than a hand motion as heretofore usual, although this new pump may be operated by the combined forces imparted by both foot and hand.

The invention consists in an air-pump comprising a vertical cylinder having a conduit for compressed air leading therefrom, and having its movable piston rod, extending above the upper end of the cylinder, provided with a fixed transversely extended member, a rod connected to and depending below said member and provided with a yoke to be engaged, and to be raised and lowered, by the foot, and means for holding, by the hand, the cylinder stationary, while the piston is being foot-operated.

The improved pump in its preferred construction comprises duplicated cylinders having conduits for delivering compressed air leading from both cylinders joined into a single common connection together with a member connected with and transversely extending between both of the piston rods above the upper ends of the cylinders, and carrying rods depending below said members which support the foot engagement yoke which is slidably engaged at opposite ends thereof with the sides of the cylinders; and, moreover, the device to be grasped by one hand of the operator while the pump is being operated, for holding the cylinder stationary, is made vertically adjustable to conduce to the convenience of persons of different heights or habits.

The improved pump is illustrated in the accompanying drawings in which:—

Figure 1:
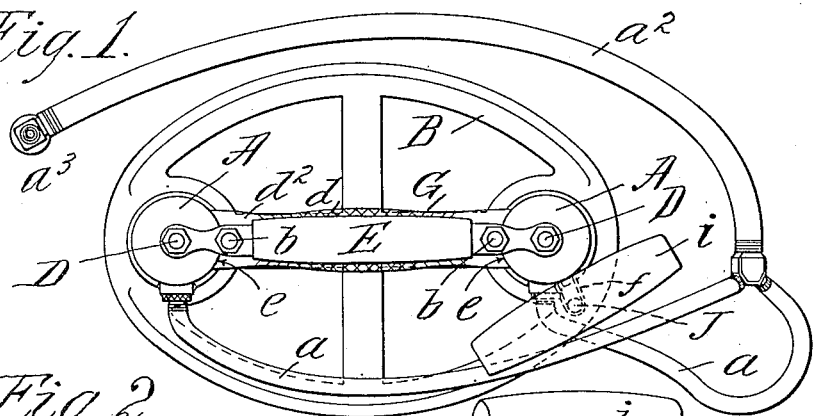
Figure 2:
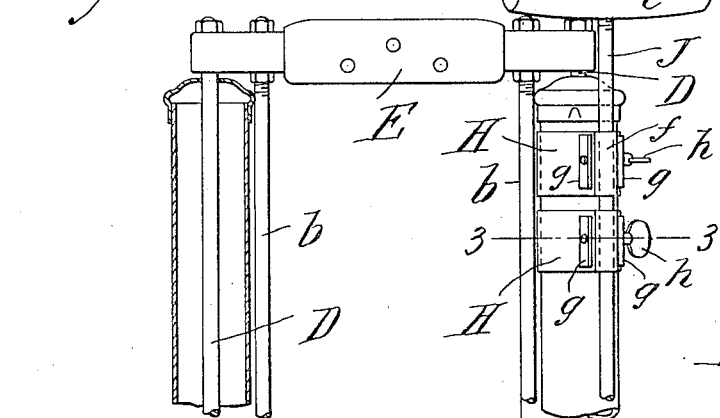
Figure 3:
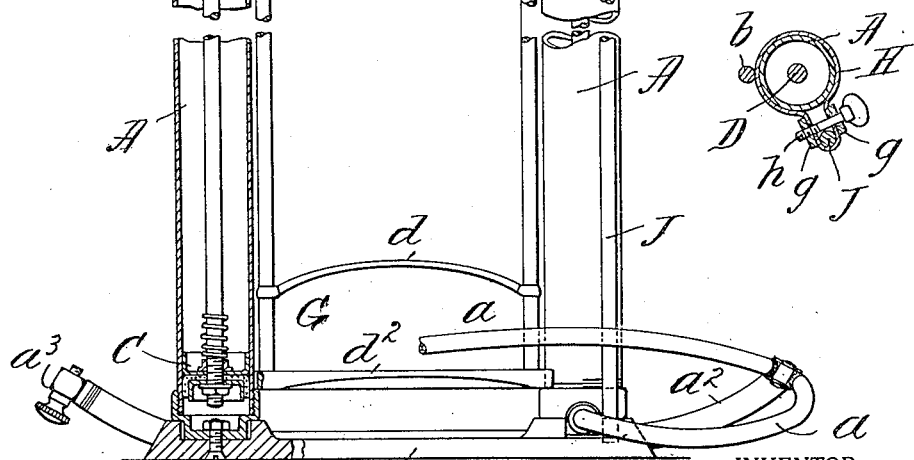

Figure 1 is a plan view; Fig. 2 is a front elevation with one of the cylinders shown in central vertical section; Fig. 3 is a cross sectional view in detail as taken on line 3—3, Fig. 2.

I will now proceed to describe the air pump in detail and as I have constructed the same.

In the drawings,—A A represent duplicated axially vertical and parallel pump cylinders supported by and connected with a base B, both having pistons C (one thereof being shown at the left of Fig. 2), and piston rods D D, the piston and valve arrangements for each cylinder being of any approved kind and generally such as usual in the most ordinary description of air pump.

From the lower end of each cylinder a conduit $a$ leads, the two conduits being brought together and connected with a single flexible connection $a^2$ which is equipped with a coupling device $a^3$ whereby the air delivery conduits may be connected with the valve stem appurtenant to the pneumatic tire of the automobile or with any other desired appliance. The reciprocating piston rods D D extend above the upper ends of the cylinders, and a bar-like member E extends between and is connected with both of the piston rods. This bar-like member E has rods $b\ b$ connected thereto and depending therebelow along the inner sides of the cylinders and carries, disposed between and connected with lower end portions thereof, a yoke G comprising separated upper and lower members $d, d^2$, the upper member D being arched, and the yoke as a whole being designed to receive engagement therewithin of the foot of the operator whereby by a foot and leg motion he may raise and lower the yoke and with it the frame comprising the parts $b\ b$ and E, and the therewith connected piston rods D D. The opposite end portions of the lower member $d^2$ of the yoke G are curved with concavities $e$ corresponding to the peripheries of the cylinders, and these so-formed end portions have guiding engagements with the cylinders.

One or preferably a pair of metallic straps H H encircle one of the cylinders near its upper end, each strap having a looped portion $f$ and two metallic blocks $g\ g$ are provided at either side of the neck of the loop; and a thumb screw $h$ has its shank passed loosely through one of the blocks and through the strap at the neck of the loop and with a screw-thread engagement into the other block; and a comparatively long rod J,—having a handle i at its upper end,—is engaged through the strap loop and may be confined in its adjustment at any desired height by loosening the thumb screws, sliding the rod upward or downward and again tightening the screws.

In operation a person first grasping the handle i of the rod J, which at the time of use is to all intents and purposes a rigid fixture of the pump body, engages the toe portion or body of the foot into the yoke G and by a leg motion alternately raises and returns to the lowered position the yoke, rods b b, transverse connecting member E and piston rods and pistons for the air compressing and delivering operation. For the convenience of some persons, and in order that they may stand erect and operate the pump without stooping, the rod J may be adjusted so that its handle i is at or about waist height and above the top of the cylinders, which commonly are about knee heights, but where a maximum force is to be exerted in pumping, the handle is lowered nearly down to the level of the top of the cylinders, and the operator in addition to raising and lowering the yoke frame G, b b, E, by employment of the foot also augments the power by the hand which grasps and upwardly draws and downwardly forces, through the medium of the transverse member E.

I claim:—

1. In an air-pump, a vertical cylinder having a connection for compressed air leading therefrom, and having its movable piston rod, extending above the upper end of the cylinder, provided with an affixed transversely extended member, a rod connected to and depending below said member and provided with a yoke comprising separated upper and lower portions to be engaged, and to be raised and lowered, by the upper and sole portions of a person's foot, and a part connected with the cylinder and adapted to be held by the hand for holding the cylinder stationary while the piston rod is being foot operated.

2. In an air-pump, a vertical cylinder having a connection for compressed air leading therefrom, and having its piston rod, extending above the upper end of the cylinder, provided with an affixed transversely extended member, a rod connected to and depending below said member and provided with a yoke to be engaged, and to be raised and lowered, by the foot, and slidably guided on the cylinder, a rod, vertically adjustable relatively to the pump, and means for detachably confining it at a desired height, and a handle at the upper end of said rod.

3. In an air-pump, a pair of separated vertical cylinders having conduits for delivering compressed air leading therefrom, and having their reciprocating piston rods extending above the upper ends of the cylinders, a member connected with and transversely extending between the piston rods above the cylinders having rods connected thereto and depending below said member along the sides of the cylinders, a yoke to be engaged, and to be raised and lowered, by the foot, extending between and connected to lower portions of said rods, and a part connected with one of the cylinders and adapted to be held by the hand for holding the cylinders stationary while the duplicated piston rods are being foot operated through said yoke.

4. In an air-pump, a pair of separated vertical cylinders having conduits for delivering compressed air leading therefrom, and a single conduit with which both the first named conduits are connected, and said cylinders having their reciprocating piston rods extending above the upper ends of the cylinders, a member connected with and transversely extending between the piston rods above the cylinders, having rods connected thereto and depending below said member along the inner sides of the cylinders, a yoke comprising separated upper and lower members to be engaged by the top and bottom of a foot of the operator, and to be raised and lowered, by such foot, extending between and connected to lower portions of said rods, and having guiding engagements with the cylinders, one or more metallic straps encircling one of the cylinders and each having a looped portion and a screw threaded device for constricting the loop and a rod having a handle at its upper end engaged through such strap loops adapted to be adjusted and secured at variable heights for the purpose set forth.

5. In an air-pump, a pair of separated vertical cylinders having conduits for delivering compressed air leading therefrom, and a single conduit with which both the first named conduits are connected, and said cylinders having their reciprocating piston rods extending above the upper ends of the cylinders, a member connected with and transversely extending between the piston rods above the cylinders, having rods connected thereto and depending below said member along the inner sides of the cylinders, a yoke comprising separated upper and lower members to be engaged by the top and bottom of a foot of the operator and to be raised and lowered, by such foot, extending between and connected to lower portions of said rods, and having guiding engagements with the cylinder, a metallic strap encircling one of the cylinders and having a looped portion, a pair of metallic blocks at either side of the neck of the loop, a thumb-screw having its shank passed loosely through one of the blocks and the strap at the neck of the loop and with a thread engagement into the other block, and a rod,—having a handle at its upper end,—engaged through the strap loop, and to be confined at any desired height, for the purpose explained.

Signed by me at Springfield, Mass., in presence of two subscribing witnesses.

SVEN DAHLBERG.

Witnesess:
GUSTAF N. TEGNELL,
WM. S. BELLOWS.